E. SMITH & S. COWLES.

Jennette L. Cowles Admin'x of S. Cowles, dec,d. J. E. Wisner, Assignee.

HORSE HAY-RAKE.

No. 7,696. Reissued May 22, 1877.

Witnesses;
Grenville Lewis
M. Chunch

Inventors
Edward Smith
Jennette L. Cowles
Administratrix of the Estate of
Sidney Cowles, deceased.
By Hill, Ellsworth & Hill their Atty.

N. PETERS, PHOTO-LITHOGRAPHER, WASHINGTON, D. C.

UNITED STATES PATENT OFFICE.

EDWARD SMITH, OF NORTHFORD, AND JENNETTE L. COWLES, OF ORANGE, CONN., ADMINISTRATRIX OF SIDNEY COWLES, DECEASED, ASSIGNORS TO JAMES E. WISNER, OF FRIENDSHIP, NEW YORK.

IMPROVEMENT IN HORSE HAY-RAKES.

Specification forming part of Letters Patent No. 33,267, dated September 10, 1861; reissue No. 7,696, dated May 22, 1877; application filed December 27, 1876.

*To all whom it may concern:*

Be it known that SIDNEY COWLES and EDWARD SMITH, both of Northford, in the county of New Haven and State of Connecticut, did invent certain new and useful Improvements in Horse-Rakes; and we do hereby declare the following to be a full, clear, and exact description of the construction and operation of the same, reference being had to the accompanying drawings, and to the letters of reference marked thereon, in which—

Figure 1:
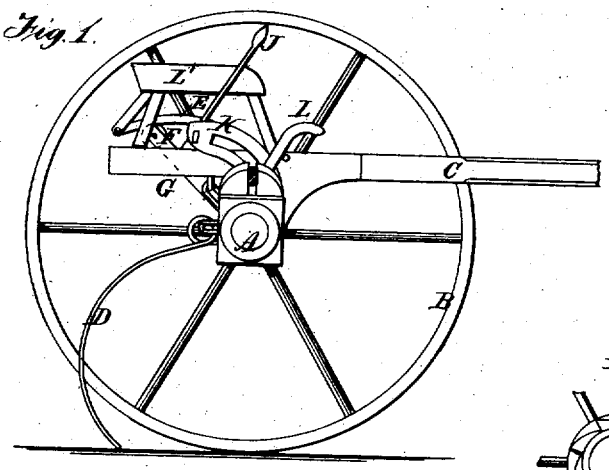
Figure 4:
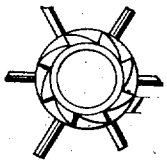
Figure 2:
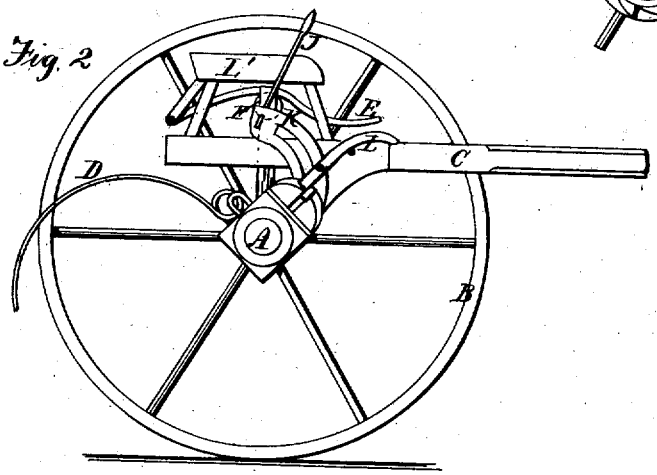
Figure 3:
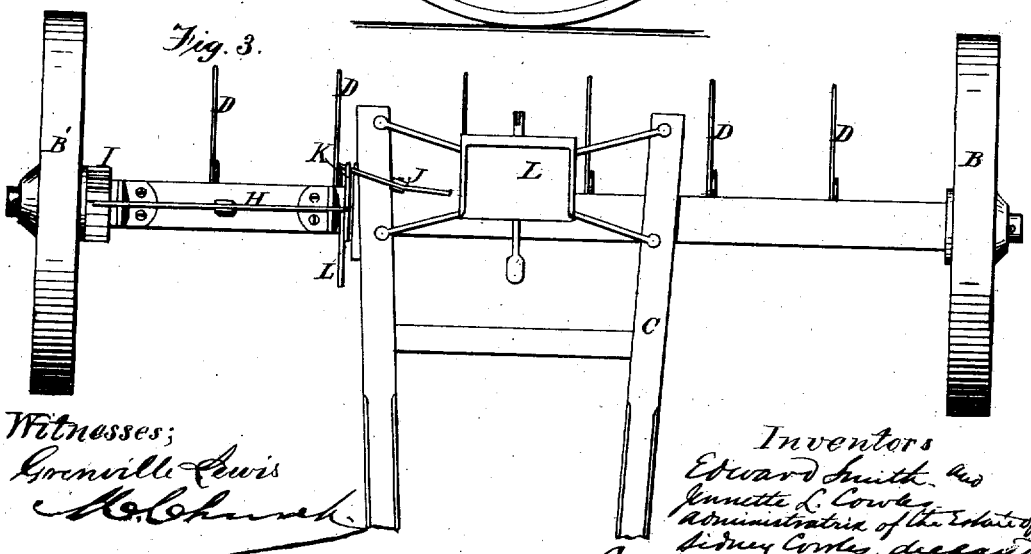

Figure 1 is an elevation of the machine or implement, with the near wheel removed, showing the rake-teeth depressed, ready to gather its load of grass, hay, or other material. Fig. 2 is a similar view, showing the rake-teeth as elevated to drop their gathered load, or to permit the machine to be moved about without having the rake-teeth operate. Fig. 3 is a plan view of the machine; and Fig. 4, an elevation of the inside of the near wheel, showing the ratchet-wheel by which the rake-teeth are elevated.

Prior to the invention herein to be described, various attempts, more or less successful, had been made by others to produce a good practical horse hay-rake, having a rake-head for the support of the teeth, capable of being locked at will with the hub of the draft-wheel, for the purpose of dumping the hay by the draft of the team, at the will of the operator. Many of these devices were capable of practical work; but the great objection to them was their want of simplicity, and their consequent cost, inconvenience, weight, and liability to get out of order or to operate inefficiently.

The object of this invention was to produce in as simple, light, and cheap a form as possible a strong, durable, convenient, and efficient wheeled rake, capable of dumping the hay at the will of the operator, and without the practical disadvantages of prior rakes of that class.

To this end the inventors adopted the tilting, in contradistinction to the revolving, form of rake, and dispensed entirely with a separate rake-head, by attaching the rake-teeth directly to the main axle, which they made to tilt on its journals in the hubs of the draft-wheels, for the purpose of raising and lowering the rake-teeth; and having thus reduced the structure to the least possible number of parts, they, in pursuance of the same policy, attached a ratchet rim or wheel to the hub of the draft-wheel, and a dog or pawl directly to the tilting-axle, so that the entire structure consisted, essentially, of only the wheels, teeth, axle, ratchet, and dog, with the thills, seat, and operating-lever. Their invention was thus distinguished in its principle from all revolving rakes, from all tilting rakes having the teeth supported otherwise than by direct connection to the main axle, and from all self-dumping rakes having the ratchet otherwise than on the hub of the draft-wheel, or the pawl or dog otherwise than directly on the tilting main axle, and consisted in a machine organized with the teeth, axle, wheels, dog or pawl, and ratchet in the relation to each other as above indicated, whereby the objects which we have referred to were enabled to be practically carried out.

In the drawings referred to, A is the axle-tree of the machine, supported upon and by the truck-wheels B B′, which revolve upon it in the usual manner. C are the shafts, to which the animal by which the machine is drawn is attached. They are secured to the axle-tree by a pivoted joint, so that the latter can turn a portion of a revolution to raise the rake-teeth from the ground, as hereinafter described. D are the rake-teeth, secured to the axle-tree A in the ordinary manner, and so formed that they possess sufficient elasticity to permit them to rise or spring over stones and other obstacles of a small size that may be in their track. They are kept in contact with the surface of the ground, to gather up into heaps the hay, grass, or other material to be gathered, by the curved lever E, working upon and over the pulley F on the arm G, attached to the axle-tree, which lever is operated by the foot of the person who directs the operation of the machine. They are elevated from the ground, to deliver the gathered load, or to allow the machine to be moved about without having them operate, by the operator forcing the outer end of the lever H into contact with the teeth of the ratchet-wheel I on the inside of the near wheel B′, by pulling toward him the handle of the bell-crank lever J, the lower end of which lever is connected with the curved lever K, which has a curved slot formed in it, in which the inner end of the lever H is placed and worked, by which the movement of that wheel of the machine is employed to raise the rake-teeth and their gathered load, instead of having that object effected by the strength of the operator. The rake-teeth, when thus raised, are kept up by the pawl L, which is pivoted to the lower end of the curved lever K, dropping upon and over the inner end of the lever H, and holding it, and through it the axle-tree A, until the said pawl is released, and the axle-tree allowed to turn back and the rake-teeth to drop to the ground, to be operated in raking, as before. The pawl is released from contact with the inner end of the lever H by the operator pulling toward him the handle of the bell-crank lever J, the front of the pawl resting against a pin on the side of one of the shafts C, elevating thereby the curved lever K, and raising the pawl against the pin named, so that its lower end moves off from the lever H, releasing that lever and allowing the rake-teeth to drop to the ground by their weight, and by the pressure of the foot of the operator upon the lever E, acting upon the axle-tree to turn it back to its first position. L′ is a seat for the person operating the machine, so placed upon the shafts C that the lever E shall be in reach of his foot, and the handle of the bell-crank lever J in reach of his hand, so that they can both be readily operated at the proper time.

When the machine is to be moved about from place to place, the rake-teeth are depressed and brought in contact with the surface of the ground, as shown in Fig. 1, by releasing the pawl L from contact with the inner end of the lever H, by the operator pulling the handle of the bell-crank lever J toward him, and depressing the lever E by his foot, to turn back the axle-tree, and with it the rake-teeth, as before noted. When the rake-teeth have gathered a sufficient load of material, they are elevated from the position shown in Fig. 1 to the position shown in Fig. 2, by the operator pulling the handle of the lever J toward him, forcing the outer end of the lever H into contact with the teeth of the ratchet-wheel I, and causing the truck-wheel to perform the operation of turning the axle-tree and lifting the rake-teeth and their gathered load.

We claim as the invention of said SMITH and COWLES—

1. The combination of the curved lever E, roller F, and arm G with the axle-tree A, for the purpose of depressing and holding the rake-teeth D in contact with the surface of the ground.

2. The combination of the bell-crank lever J with the levers K and H, pawl L, and ratchet-wheel I, for the purpose of elevating the rake-teeth from the ground, and for holding them when so elevated, as herein described.

3. In a wheeled horse hay-rake, the combination of a tilting main axle, rake-teeth attached directly to said axle, so as to be raised and lowered by the tilting thereof, a ratchet fixed to the draft-wheel hub, and a pawl or dog attached to the tilting-axle, and adapted to lock with the ratchet, whereby the forward movement of said wheel, when the ratchet and pawl or dog are engaged, tilts the axle and discharges the hay, substantially as and for the purposes set forth.

EDWARD SMITH.
JENNETTE L. COWLES,
*Administratrix of Sidney Cowles, deceased.*

Witnesses:
F. C. BARTHOLOMEW,
MARK TUCKER,
WM. H. TALLMADGE,
M. CHURCH.